(12) United States Patent
Perron et al.

(10) Patent No.: US 8,527,885 B2
(45) Date of Patent: Sep. 3, 2013

(54) METHOD FOR MANAGING MEMORY IN A CLIENT TERMINAL, CORRESPONDING SIGNAL, COMPUTER PROGRAM AND TERMINAL

(75) Inventors: Julien Perron, Rennes (FR); Elouan Le Coq, Rennes (FR); Jean-Claude Dufourd, Le Kremlin Bicetre (FR)

(73) Assignee: Streamezzo, Paris (FR)

( * ) Notice: Subject to any disclaimer, the term of this patent is extended or adjusted under 35 U.S.C. 154(b) by 589 days.

(21) Appl. No.: 12/446,410

(22) PCT Filed: Oct. 16, 2007

(86) PCT No.: PCT/EP2007/061032
§ 371 (c)(1),
(2), (4) Date: Nov. 8, 2010

(87) PCT Pub. No.: WO2008/046827
PCT Pub. Date: Apr. 24, 2008

(65) Prior Publication Data
US 2011/0047470 A1     Feb. 24, 2011

(30) Foreign Application Priority Data
Oct. 18, 2006 (FR) ..................................... 06 09144

(51) Int. Cl.
*G06F 3/00* (2006.01)
*G06F 7/04* (2006.01)
*G06F 12/00* (2006.01)
*G06F 12/14* (2006.01)
*G06F 13/00* (2006.01)

(52) U.S. Cl.
USPC .......................................... 715/738; 726/19

(58) Field of Classification Search
USPC ............................................ 715/738; 726/19
See application file for complete search history.

(56) References Cited

U.S. PATENT DOCUMENTS

| 6,911,982 B1 * | 6/2005 | Signes .......................... 345/473 |
| 6,963,972 B1 * | 11/2005 | Chang et al. .................. 713/153 |
| 2004/0202382 A1 * | 10/2004 | Pilu .............................. 382/276 |
| 2005/0083755 A1 | 4/2005 | Choi |
| 2005/0086354 A1 * | 4/2005 | Orchard ........................ 709/231 |
| 2007/0180496 A1 * | 8/2007 | Fransdonk ........................ 726/3 |
| 2009/0079735 A1 * | 3/2009 | Dufourd et al. ............... 345/420 |

(Continued)

FOREIGN PATENT DOCUMENTS

| EP | 1 679 911 A | 7/2006 |
| WO | WO 2006/080694 A | 8/2006 |

OTHER PUBLICATIONS

International Search Report from counterpart foreign Application No. PCT/EP2007/061032.
Written Opinion from International Patent Application No. PCT/EP2007/061032, dated Jan. 25, 2008.
Office Action from Chinese Patent Application No. 200780038794.9, dated Feb. 22, 2012 (translation only).

(Continued)

*Primary Examiner* — David Phantana Angkool
(74) *Attorney, Agent, or Firm* — Zilka-Kotab, PC

(57) ABSTRACT

A method is provided for managing memory in a mobile communication terminal suitable for processing information representing a multimedia scene that comes in the form of a multimedia content having multimedia elements. The method includes a step of receiving the multimedia scene and the following steps that are implemented simultaneously: a step of rendering the scene in continuous or progressive loading mode on the terminal; and a step of storing a portion of the multimedia content representing the multimedia scene, the portion being pre-identified in the multimedia content.

10 Claims, 2 Drawing Sheets

(56) References Cited

U.S. PATENT DOCUMENTS

2010/0134587 A1* 6/2010 Grasso et al. ............. 348/14.01
2011/0047470 A1* 2/2011 Perron et al. ................ 715/738
2011/0055384 A1* 3/2011 Audinet et al. .............. 709/224

OTHER PUBLICATIONS

Notification to Grant from French Patent Application No. 06 09144, dated Sep. 17, 2012.

* cited by examiner

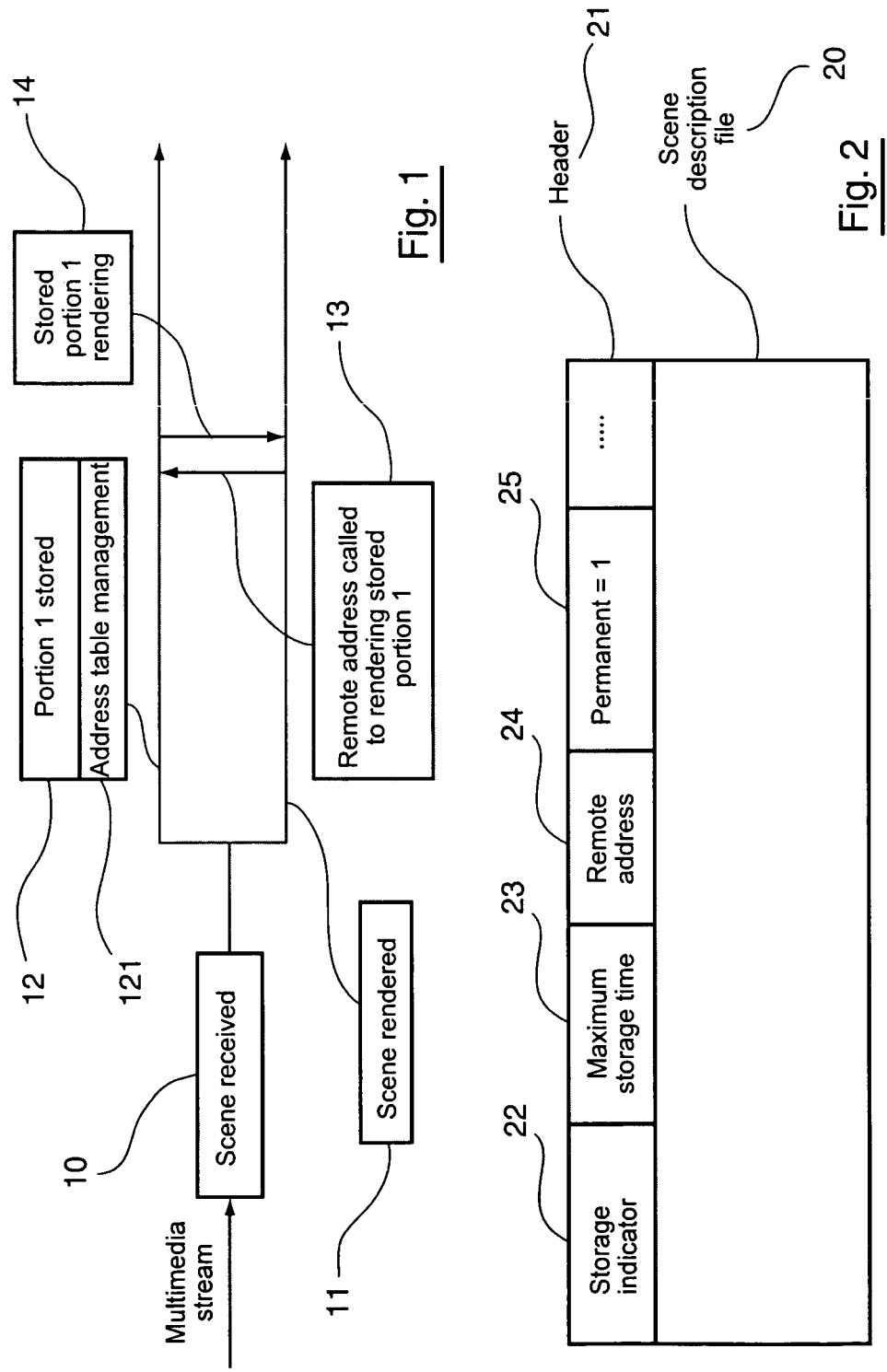

METHOD FOR MANAGING MEMORY IN A CLIENT TERMINAL, CORRESPONDING SIGNAL, COMPUTER PROGRAM AND TERMINAL

CROSS-REFERENCE TO RELATED APPLICATIONS

This Application is a Section 371 National Stage Application of International Application No. PCT/ EP2007/061032, filed Oct. 16, 2007 and published as WO 2008/046827 on Apr. 24, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the rendering of multimedia content on a radio communication terminal, such as for example a mobile telephone, Personal Digital Assistant (or PDA), portable computer, etc.

To be more precise, the disclosure is based on the management of memory in such a terminal and the simultaneous rendering of multimedia content in continuous loading mode, otherwise known as "streaming" mode, or in progressive loading mode, a mode in which the consumption of the content by the terminal starts before this content has finished downloading.

Multimedia content is taken to mean a unit consisting of at least one animated graphical scene, otherwise known as a multimedia scene, and a set of commands for changing said scene from one state to another. A multimedia scene equates in particular to the arrangement of a set of graphical objects in time and space, with which the user of the radio communication terminal is able to interact.

The disclosure can be employed in all fields that require a representation of signals in the form of a spatio-temporal arrangement of graphical objects, with interactivity, and particularly to fields where the client is able to consume multimedia scenes in streaming or progressive mode.

BACKGROUND OF THE DISCLOSURE

Techniques for transmitting a multimedia content to a radio communication terminal and for rendering said content on said terminal are already known.

These terminals also offer techniques implementing a memory management configuration in a radio communication terminal also exist.

A first technique applies to transmissions that use the communication protocol known as the Hyper Text Transport Protocol (HTTP). This communication protocol provides for a parameter, in the transport layer, indicating that the transported content is to be stored in the memory, known as the "cache" memory, in the communication terminal. This parameter indicates to the client that he must save the content in question in the cache, for a certain period of time.

One drawback with this technique is that the cache storage indication parameter applies to the transported content in its entirety, which is not always necessary, and may lead to the cache memory becoming needlessly congested, to the detriment of data transmitted later.

Nor, moreover, does this technique allow the terminal to cache store a content, while simultaneously rendering it, in streaming mode for example.

Another known technique is the insertion into one multimedia scene of another multimedia scene intended to be stored in the cache memory in the radio communication terminal. This technique can be used to meet the requirements of an early transmission of multimedia scenes, intended to be stored for later rendering.

A drawback of this technique is once again that, in this case too, it requires the whole of the transmitted content to be cached.

Another drawback of this technique is that the rendering of a multimedia content in the form of a sub-scene inserted into a main scene is much more expensive in terms of resources than that of the same content organized in the form of a single scene.

Moreover, another drawback with this technique is that it does not allow the sub-scene to be simultaneously rendered and cached. Indeed, before being rendered, the sub-scene must be transmitted and cached in its entirety.

Lastly, the sub-scene for caching must be accompanied by a command indicating to the terminal that it must render it after loading it in full.

SUMMARY

An aspect of the disclosure relates to a method for managing memory in a mobile communication terminal suitable for processing information representing a multimedia scene that comes in the form of a multimedia content comprising multimedia elements, comprising a step of receiving said multimedia scene.

According to an embodiment of the invention, such a method comprises the following steps that are implemented simultaneously:
 a step of rendering said scene in continuous or progressive loading mode on said terminal;
 a step of storing a portion of said multimedia content representing said multimedia scene, said portion being pre-identified in said multimedia content.

The inventive method thus allows a multimedia scene to be rendered, in continuous or progressive loading mode, while storing in the memory pre-identified portions of this scene, so as to be able to render them later on, without making any requests to an external server, but merely by recovering them from the local memory of the terminal.

The storage is selective, since only one (or more) part of the content is stored. Said operation is performed simultaneously with scene rendering, with no disturbance thereof.

Preferentially, the storage step is associated with a step of managing a table that assigns to a remote address of said portion, in a server, a local address in said memory of said terminal, such that a call to said remote address is systematically converted into a call to said local address.

In this way, the terminal employs a correspondence between a remote address, which might for example be the access address on a server to the scene portion to be stored, and a local memory address of the terminal.

Thus, when the terminal has to render a scene portion, following a user request for example, this is translated conventionally into a call to the remote address for accessing the portion in question. According to an embodiment of the invention, this call to the remote address is in fact converted into a call to the local address corresponding to the location in the terminal memory of the previously stored portion (if, of course, this portion has already been transmitted and stored).

According to one particular aspect of the invention, the step of storing a pre-identified portion of said multimedia content is implemented as a function of at least one storage indicator.

To advantage, said one storage indicator is associated with a field for configuring the description file of said multimedia scene and is defined by a datum as to whether a pre-identified portion of said multimedia content representing said scene is or is not to be stored in said memory of said client terminal.

This scene description file configuration field may be found at any point in the file. It may for example be a file header.

This storage indicator thus enables a determination of the scene portion to be stored, and the terminal, when it recognises it, knows that it has to store a scene portion, simultaneously with rendering the scene.

In particular, the field for configuring the description file of said multimedia scene further comprises at least one parameter that defines a maximum period of time for storing said portion of said multimedia content in the memory of said client terminal.

This parameter thereby allows the terminal to know for how long it has to save the scene portion in its memory, thereby improving memory management, by freeing up the space occupied by a scene portion as specified by this time limitation parameter.

Preferentially, the field for configuring the description file of said multimedia scene further specifies at least one of the parameters belonging to the group comprising:
- a remote address of said portion of said multimedia content stored in said memory of said client terminal;
- a datum as to whether said portion of said multimedia content is to be stored in said memory of said client terminal, beyond a user session.

The description file configuration field can thus also be used to give the terminal indications about the portion to be stored, by specifying the address at which the portion can be accessed (on a remote server for example).

Moreover, a parameter of this configuration field can be used to indicate to the terminal if the portion for storing is to be stored beyond the user session, for example where the scene portion can be re-used in other multimedia scenes, with the rendering thereof being required in another user session.

According to a particular inventive feature, said storage indicator forms a means of discriminating between at least one portion of said multimedia content of said multimedia scene that is to be stored in said memory of said client terminal and at least one other portion that is not to be.

The storage indicator thus allows a single portion, or a plurality of portions, of a multimedia scene to be stored, while other portions are not. By using this indicator, the terminal knows which portion of the scene is to be stored and which portion is not to be.

Preferentially, said at least one storage indicator comes in the form of a time signal determining that the portion of said multimedia scene received before said signal is to be stored whereas the portion of said multimedia scene received after said signal is not to be stored. The terminal knows that from the moment this time indicator is detected it must no longer store the rest of the scene.

Another inventive feature relates to a computer program product that can be downloaded from a communication network and/or stored on a medium that can be read by a computer and/or run by a microprocessor, comprising program code instructions for implementing the terminal memory management method as described above.

Another inventive feature relates to a signal representing a multimedia scene that comes in the form of a multimedia content comprising a set of multimedia elements, transmitted in continuous loading mode between at least one server terminal of multimedia scenes, and at least one client terminal on which said scene is rendered. Such a signal comprises at least one indicator for the storage in said client terminal of a portion of said multimedia content representing said multimedia scene, said indicator being directly interpretable by the memory management method in a terminal.

Lastly, another inventive feature relates to a radio communication terminal comprising means for receiving a multimedia scene that comes in the form of a multimedia content comprising multimedia elements. Such a terminal comprises in particular the following means that are implemented simultaneously:
- means for rendering said scene in continuous loading made on said terminal;
- means for storing a portion of said multimedia content representing said multimedia scene, said portion being pre-identified in said multimedia content.

BRIEF DESCRIPTION OF THE DRAWINGS

Other characteristics and advantages will become clearer from reading the following description of a particular embodiment, given as a simple illustrative and non-restrictive example, and the appended drawings, among which:

FIG. 1 shows an example of the memory management method implemented in a client terminal according to a particular embodiment of the invention;

FIG. 2 shows an example of a multimedia scene description file according to a particular embodiment of the invention;

DETAILED DESCRIPTION OF ILLUSTRATIVE EMBODIMENTS

Figure 3:
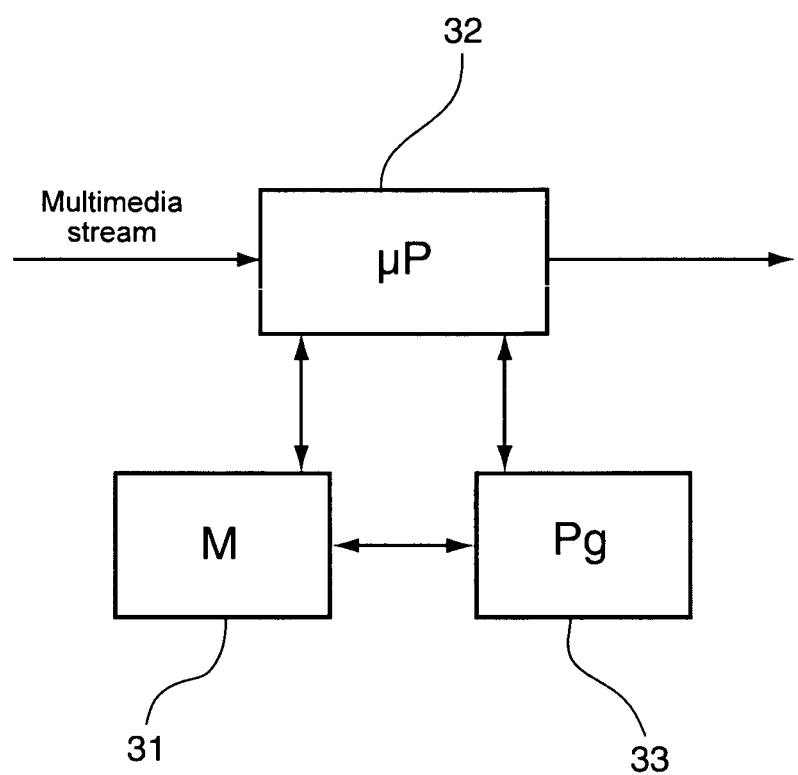
FIG. 3 shows an example of a part of the simplified structure of a client terminal implementing a memory management technique according to a particular embodiment of the invention.

The general principle of an embodiment of the invention is based on the storage of a portion of a multimedia scene, simultaneously with the rendering of the scene, in a client terminal.

The inventive method can thus be used to store a portion of a multimedia scene without impairing the simultaneous rendering of the same multimedia scene, in continuous or progressive loading mode.

An example is given, in relation to FIG. 1, of the implementation of the memory management method in a client terminal, according to a particular embodiment of the invention.

A multimedia stream is considered, described in accordance with this embodiment of the invention (see below the description of FIG. 2), transmitted by a server to a client terminal.

The inventive memory management method comprises firstly a step 10 wherein the client terminal receives the multimedia scene transmitted in the stream, and two simultaneous steps, one 11 wherein the scene is rendered in streaming or progressive mode, the other 12 wherein a scene portion is stored. Clearly, the storage step 12 is only active when the data being received corresponds to a scene portion that is required to be stored.

Thus, when the client terminal detects a storage indicator (described below in relation to FIG. 2) for a scene portion, it stores the portion in question, while continuing to render the scene.

For the user, this storage step is not visible and does not interfere with rendering. On the contrary, the storage of some scene portions improves multimedia scene management within the terminal, by using locally stored portions instead of looking for them on a server every time the scene needs them, and therefore cuts down the data transmitted and improves fluidity in the development of a multimedia scene.

This storage step 12 is associated, according to the present embodiment, with a step 121 for managing an address table, wherein are associated a remote address, which might for example be the address used for the scene request, otherwise known as the Uniform Resource Locator (URL), and a local address for storing the scene portion in the terminal.

Consideration is given, while the scene is being rendered in streaming mode, or in progressive mode, to a scene portion that is to be rendered at a given time, for example subsequent to an action taken by the user.

This scene portion rendering corresponds to a request, in other words a call 13 to a remote address, defining the access means to the portion in question.

Memory management according to this embodiment can be used to find out, by using the address table, whether this portion is stored in the terminal. If this is the case, the terminal recovers the portion in question from the memory, so as to render it in a rendering step 14.

In order to render the scene portion from the memory as represented by a call 13 to a remote address, for example the scene request URL, the terminal searches, in the pre-filled in (when the portion was stored) address association table, for the local address where the portion is stored. The terminal is thus able to find the stored portion locally instead of making a request to the remote address.

To be more precise, the description parameters are now shown, in relation to FIG. 2, of a multimedia scene that allows the terminal to manage stored scene portions, in the present embodiment.

Consideration is given to a multimedia scene described in a description file 20, itself transmitted from a server to a client terminal. The client terminal receives this scene description file 20 and processes it so as to be able to render the scene.

According to this particular embodiment, a multimedia scene description file 20 comprises a header 21 (or a configuration field placed in the description file), wherein parameters are specified that in particular allow the terminal to manage stored scene portions.

In particular, a storage indicator 22 allows the terminal to know if one or more portions of the scene are or are not to be stored. The indicator 22 may thus be a Boolean, equal to 1 to indicate a request for storage and equal to 0 in the contrary event.

According to one alternative of this mode of implementation, the mere presence of this indicator, whatever the value thereof, may signify a storage request, and consequently the absence of this indicator implies that no storage is required.

In another alternative, the indicator 22 may be a time signal, i.e. transmitted at a given time in the multimedia scene transmission, indicating that the scene portion received by the terminal before this indicator is to be stored, and the portion received afterwards is not to be.

Generally speaking, this indicator allows the terminal to know if one or more portions of the scene are to be stored.

The header 21 of the description file 20 also comprises a time limitation parameter, specifying a maximum storage time 23 for the scene portion in the client terminal memory.

This parameter, also known as "Time To Live" (TTL), is used to specify the storage life span in a terminal of a multimedia scene portion.

For example, a file header, or a file configuration field, is considered comprising a storage indicator (specifying a request for the storage of a multimedia scene portion), followed by a maximum storage time equal to one minute.

After this scene description file, and particularly the header thereof, has been processed, the client terminal will store the scene portion in question for a minute, and will release the memory at the end of this minute.

The header 21 of the file may also comprise an address, known as a remote address 24, which is the access means to a scene portion so that it can be rendered. This remote address may for example be the URL used in the scene request, i.e. the address for accessing the server that hosts all scene-related data.

As far as this example is concerned, the memory management method implemented in the terminal will store, at the same time as the scene portion under consideration, the remote address giving access to this element, and associate the local address with it in the terminal memory.

This address association, managed in an address table, allows the terminal to access the stored scene portion instead of making a request to the remote address.

According to one alternative of this particular inventive embodiment, the remote address parameter is not given in the file header. The terminal is then able to make use of the reference address used to obtain the scene portion for storage as the local memory address, which will then allow it to find the scene portion locally.

Consideration is now given to another, so-called "permanent", parameter 25 of the file header, for indicating to the terminal that the portion or portions of the scene to be stored must be saved in the memory beyond the client session.

This "permanent" parameter may for example be a Boolean indicating, when it is equal to 1, that the scene portion to be stored must be saved in the memory beyond the client session for the maximum storage time specified in parameter 23. When it is equal to 0, the terminal knows that the stored portion must not be saved beyond the client session.

According to one alternative, provision may be made for this parameter 25 to indicate, through its mere presence in the file header, and whatever the value thereof, that the stored scene portion is to be saved beyond the user session.

This parameter allows the terminal to save multimedia scene portions that can be used to render a plurality of different scenes, thereby allowing savings in terms of data transmitted, since some data is not retransmitted as it is already in the memory in the terminal.

This "permanent" parameter may also be termed "non-transient".

According to one example of the implementation of the memory management method, the following parameters may be considered in the multimedia scene description file header:

storage indicator 22: "Cacheable";
maximum storage time 23: "client CacheTtl";
parameter 25: "permanent".

The following example of a description file header can then be obtained:

<header     cacheable="true"clientCacheTtl="1mn"
    permanent="true"/>

Lastly in relation to FIG. 3 a part of the simplified structure of a client terminal is shown that implements a memory management technique according to the particular embodiment described above.

Such a client terminal comprises a memory 31 constituted by a buffer memory, a processor unit 32, equipped with a microprocessor µP for example, and controlled by the computer program 33, implementing the inventive memory management method.

On initialization, the computer program code instructions 33 are loaded for example into a RAM memory before being run by the processor of the processor unit 32. The processor unit 32 receives at input a multimedia stream comprising at least one multimedia scene. The micro-processor of the processor unit 32 implements the steps in the memory management method described previously, according to the computer program instructions 33, in order to render the multimedia scene in continuous ("streaming"), or progressive loading mode and store a portion of the scene. To do this, the client terminal comprises, apart from the buffer memory 31, means for rendering the multimedia scene in streaming or progressive mode and means for storing a portion of the scene. These means are controlled by the micro-processor of the processor unit 32.

The processor unit 32 can therefore be used, simultaneously, to render the scene and store portions of the scene.

At least one embodiment of the disclosure provides a technique that allows a client terminal to manage the cache memory, and particularly in order to allow only part of a multimedia content to be stored.

An embodiment allows the memory management while said content continues to be rendered in continuous or progressive loading mode.

At least one embodiment provides such a technique that allows a precise memory management configuration in the client terminal, particularly in terms of defining the multimedia content elements intended for storage in the terminal.

An embodiment provides such a technique that offers improved performance in terms of memory management in the terminal of a multimedia content part and of the simultaneous rendering of said content in continuous or progressive loading mode.

It should be noted that these features have been formulated on the basis of a new problem being identified, and one not suggested by the prior art.

Although the present disclosure has been described with reference to one or more examples, workers skilled in the art will recognize that changes may be made in form and detail without departing from the scope of the disclosure and/or the appended claims.

The invention claimed is:

1. A method comprising:
receiving a multimedia scene including multimedia content at a mobile communication terminal; and
simultaneously rendering the multimedia scene in continuous or progressive loading mode on the terminal and storing a portion of the multimedia content representing the multimedia scene, the portion being pre-identified in the multimedia content;
wherein the storing includes assigning a local address in a memory of the mobile communication terminal to a remote address indicating a location of the portion of the multimedia content at a server, such that a call to the remote address is converted into a call to the local address.

2. The method as claimed in claim 1, wherein the storing the pre-identified portion of the multimedia content is implemented as a function of at least one storage indicator.

3. The method as claimed in claim 2, wherein the at least one storage indicator is associated with a field for configuring the description file of the multimedia scene and is defined by a datum as to whether a pre-identified portion of the multimedia content representing the scene is or is not to be stored in the memory of the client terminal.

4. The method as claimed in claim 3, wherein the field for configuring the description file of the multimedia scene further comprises at least one parameter that specifies a maximum period of time for storing the portion of the multimedia content in the memory of the client terminal.

5. The method as claimed in claim 3, wherein the field for configuring the description file of said multimedia scene further specifies one or more of a remote address of said portion of the multimedia content stored in the memory of the client terminal and a datum as to whether the portion of the multimedia content is to be stored in said memory of the client terminal, beyond a user session.

6. The method as claimed in claim 2, wherein the at least one storage indicator discriminates between at least one portion of the multimedia content of the multimedia scene that is to be stored in the memory of the client terminal and at least one other portion that is not to be.

7. The method as claimed in claim 2, wherein said at least one storage indicator comes in the form of a time signal determining that the portion of the multimedia scene received before the signal is to be stored whereas the portion of the multimedia scene received after the signal is not to be stored.

8. The method as claimed in claim 1, wherein the multimedia scene includes a configuration field parameter that indicates whether the stored portion may be re-used in additional multimedia scenes other than the received multimedia scene.

9. A computer program product stored on a non-transitory medium, comprising program code instructions for implementing a method, the method comprising:
receiving a multimedia scene including multimedia content at a mobile communication terminal; and
simultaneously rendering the multimedia scene in continuous or progressive loading mode on the terminal and storing a portion of the multimedia content representing the multimedia scene, the portion being pre-identified in the multimedia content;
wherein the storing includes assigning a local address in a memory of the mobile communication terminal to a remote address indicating a location of the portion of the multimedia content at a server, such that a call to the remote address is converted call to the local address.

10. A radio communication terminal comprising:
a receiver for:
receiving a multimedia scene including multimedia content at a mobile communication terminal; and
simultaneously rendering the multimedia scene in continuous or progressive loading mode on the terminal and storing a portion of the multimedia content representing the multimedia scene, the portion being pre-identified in the multimedia content;
wherein the storing includes assigning a local address in a memory of the mobile communication terminal to a remote address indicating a location of the portion of the multimedia content at a server, such that a call to the remote address is converted into a call to the local address.

* * * * *